July 31, 1962 H. O. SCHERENBERG 3,047,101
HYDRAULIC BRAKE FOR VEHICLES
Filed Oct. 18, 1957
Fig. 1.
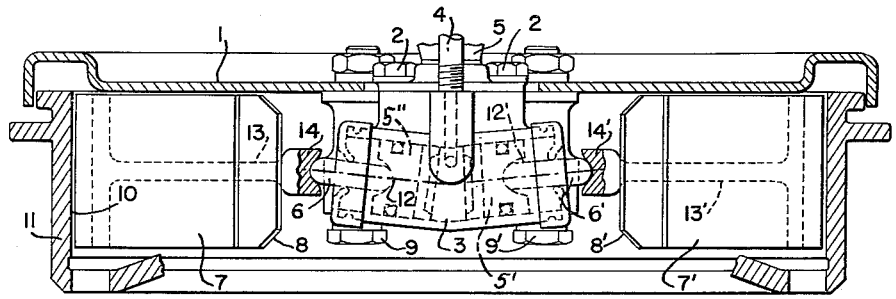
Fig. 2.
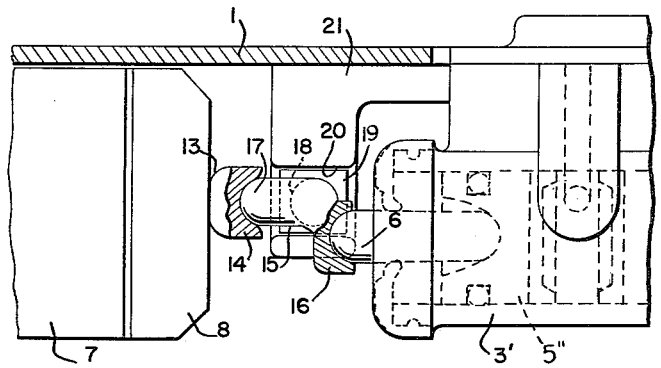
Fig. 3.
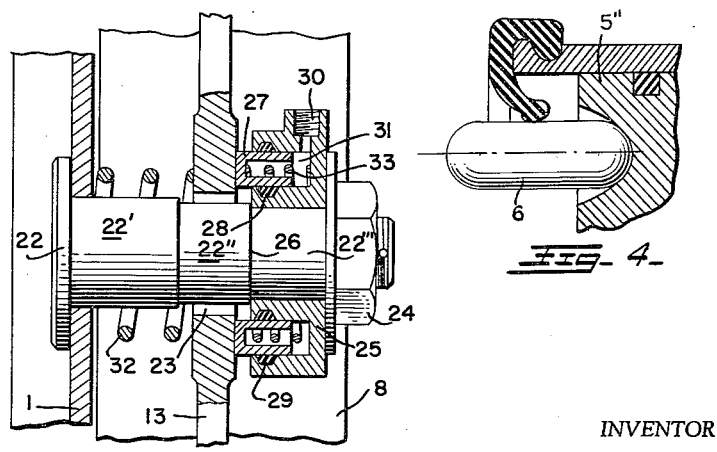
Fig. 4.
INVENTOR
HANS O. SCHERENBERG
BY *Dicke and Craig*
ATTORNEYS United States Patent Office 3,047,101
Patented July 31, 1962

3,047,101
HYDRAULIC BRAKE FOR VEHICLES
Hans O. Scherenberg, Stuttgart-Heumaden, Germany, assignor to Daimler-Benz Aktiengesellschaft, Stuttgart-Unterturkheim, Germany
Filed Oct. 18, 1957, Ser. No. 691,022
Claims priority, application Germany Oct. 26, 1956
18 Claims. (Cl. 188—152)

The present invention relates to a hydraulically actuated shoe-type brake for motor vehicles provided with means which force or press the brake shoes against the sheet-metal support member for purposes of avoiding vibrations and therewith braking noises.

In order to obtain quiet brakes which do not squeak or produce annoying noises during braking operation thereof, the prior art arrangements utilized springs to force the brake shoes against the respective sheet-metal support members. However, in these prior art devices, relatively high spring forces are necessary in order to assure a continuous abutment of the brake shoes against the respective relatively stationary supports during the braking operation which entails the disadvantage that the brake shoes easily stick, i.e., do not release the brake upon release of the brake pedal.

For purposes of avoiding these disadvantages of the prior art, the present invention proposes an arrangement in which the brake shoes are forced during braking operation against the sheet-metal support member in dependence on the hydraulic contact pressure. Such an arrangement, on the one hand, achieves a contact or abutment pressure which is matched or corresponds to the braking force and, on the other, produces with certainty the disengagement of the brake shoes after the braking operation.

In accordance with a further feature of the present invention, the brake shoes may be pressed or forced advantageously against the sheet-metal support member by means of the pistons in the brake cylinder which serve for the actuation of the braking operation. However, intermediate or connecting link members may also be arranged between the pistons in the brake cylinder and the brake shoes which intermediate members produce, during braking, a pressure on the brake shoes in the direction toward the sheet-metal support member.

In accordance with a further feature of the present invention, separate pressure cylinders and pistons may be arranged at each sheet-metal support member which exert a pressure on each brake shoe in the proper direction, and wherein each pressure cylinder and piston assembly is supplied with brake fluid from the braking cylinder and therewith force the brake shoes increasingly against the support member with an increase in the braking force.

Accordingly, it is an object of the present invention to provide a shoe-brake arrangement which is quiet in operation and prevents vibrations and screeching or other objectionable noises during the braking operation.

Another object of the present invention resides in the provision of an arrangement for a shoe brake for motor vehicles in which vibrations of the brake shoes during braking operation are eliminated by appropriately forcing the brake shoes against a relatively stationary part such as a sheet-metal support member.

A still further object of the present invention resides in the provision of an arrangement for a shoe-type brake for motor vehicles in which the brake shoes are forced against a relatively stationary part of the brake arrangement, such as a stationary sheet-metal support member, in dependence on the hydraulic pressure in the brake system so as to provide a proper matching between the brake forces of the brake shoes along the brake drum and the abutment forces urging the brake shoes against the relatively stationary part to prevent vibrations thereof.

Another object of the present invention resides in the provision of an auxiliary system, actuated by the hydraulic pressure in the hydraulic brake system supplying liquid to the brake cylinders, which assures safe and certain disengagement of the brake shoes upon release of the brake and which nevertheless, assures sufficient pressure to force the brake shoes against a relatively stationary part so as to prevent any vibrations and objectionable noises during braking operation.

These and further objects, features and advantages of the present invention will become more obvious from the following description when taken in connection with the accompanying drawing which shows, for purposes of illustration only, several embodiments in accordance with the present invention and wherein:

FIGURE 1 is a horizontal cross-sectional view through a hydraulically actuated shoe brake in accordance with the present invention with a plan view of the brake cylinder and brake shoe thereof.

FIGURE 2 is a partial view similar to FIGURE 1 of a modified embodiment of a hydraulically actuated shoe brake in accordance with the present invention;

FIGURE 3 is a partial vertical cross-sectional view through still another embodiment of a hydraulically actuated shoe brake in accordance with the present invention in which the brake shoe is guided at the brake shoe web portion thereof by means of a stationary bolt secured at the relatively stationary sheet-metal support member; and FIGURE 4 is a partial cross-sectional view showing in greater detail the sealing means for the piston and plunger shown in either FIGURE 1 or FIGURE 2.

Referring now to the drawing, wherein like reference numerals are used throughout the various views to designate like parts, and more particularly to FIGURE 1, the hydraulic shoe-type brake thereof includes a relatively stationary part 1 in the form of a sheet-metal support member which is rigidly connected in any suitable manner with the wheel axle of a motor vehicle. The brake cylinder 3 is secured at the support member 1 by means of bolts or screws 2. The supply of brake fluid to the brake cylinder 3 which is provided with a breather or air vent 4 adapted to be closed, takes place over a connecting member 5 arranged at the brake line whereby the brake fluid, if placed under suitable pressure, for example, by means of a pedal-actuated master cylinder, displaces outwardly toward both sides the pistons 5' and 5" arranged within the brake cylinder 3. Upon outward displacement of the brake pistons, the plungers or pressure rods 6 and 6' which are operatively connected with respective brake pistons, force the brake shoes 8 and 8' provided with brake linings 7 and 7' about the pivotal connections 9 and 9' thereof arranged at the relatively stationary support member 1 against the brake surface 10 of the rotating brake drum 11 which is connected with the rotating wheel, as is well known. The sealing means associated with the plungers 6, 6' or the pistons 5', 5" are shown in greater detail in FIGURE 4.

As is quite clear from the drawing, the brake cylinder 3 is so arranged and constructed that the longitudinal center axes 12 and 12' of each half of the brake cylinder 3 is inclined in the plane of FIGURE 1 with respect to the sheet-metal support member 1.

Consequently, the plungers 6 and 6' press with the semi-spherically shaped head portions thereof against the semi-spherically shaped bearing portions 14 and 14' arranged at the inner ends of the web portions 13 and 13' of the brake shoes 8 and 8', respectively, in the direction of the respective axes 12 and 12' so that during abutment of the brake shoes 8 and 8' against the brake surface 10 of the brake drum 11 a pressure or force is exerted simultaneously against the brake shoes 8 and 8' in the direction toward the sheet-metal support member 1 and therewith the brake shoes 8 and 8′ abut against the sheet-metal support member 1 in dependence on the hydraulic contact pressure of the brake system for purposes of damping any noise-producing vibrations.

In the embodiment according to FIGURE 2, the usual arrangement and construction of the brake cylinder 3′, as is conventional in present-day brake constructions, is maintained. However, an intermediate member 15 is arranged between the plunger 6 and the bearing portion 14 provided at the web portion 13 of the brake shoe 8 which is constructed in the manner of an angle lever. One arm of the intermediate member 15 is provided with a semi-spherically shaped bearing portion 16 for the plunger 6 while the other arm of the angle lever 15 is provided with a semi-spherically head portion 17 for engagement with the bearing portion 14. A vertical pin 18 provided at the intermediate member 15 is rotatably supported in a slidable shoe member 19 which in turn is slidably arranged in a recess 20 of a housing part 21 formed advantageously integrally with the brake cylinder 3′. The other half of the shoe-brake in FIGURE 2 is constructed symmetrically identical with respect to the part shown in the drawing.

Upon actuation of the brake by supplying braking fluid under pressure, the plunger 6 displaces the intermediate member 15 inclusive the slidable shoe member 19 until abutment of the brake lining (not shown) at the brake surface (not shown) and simultaneously therewith rotates the intermediate member 15 with the pin 18 in the slidable shoe member 19 in such a manner that the brake shoe is also forced against the sheet-metal support member or plate 1 in dependence on the hydraulic braking or contact pressure for purposes of avoiding noise producing vibrations.

In the embodiment according to FIGURE 3, a stepped bolt member 22 having three stepped sections 22′, 22″ and 22‴ of decreasing diametric dimension is secured at the support sheet-metal member 1. The bolt member 22 extends through an aperture 23 provided in the web portion 13 of the brake shoe 8. An annular cylinder member 25 having an annular cylinder space 31 is secured against a collar 26 formed between the stepped portions 22″ and 22‴ of the bolt member 22 by means of a nut member 24. An annular piston member 27 is accommodated within the cylinder space 31 of the annular cylinder member 25. The annular piston member 27 is slidingly accommodated within the annular cylinder space 31 and is spring-loaded by means of a coil spring 33 accommodated within the hollow space formed by the essentially U-shaped cross section of the piston member 27. The spring 33 thereby abuts against the cylinder member 25 with one end thereof and against the inner face of the U-shaped cross section of the piston member 27 to hold the latter in engagement at all times with the web portion 13 of the brake shoe 8. Furthermore, annular seals 28 and 29 are provided in appropriately shaped grooves provided in the cylinder member 25 so as to provide adequate seals between the cylinder space 31 and the outside. The pressure or cylinder space 31 in the annular cylinder member 25 is in communication over an aperture 30 and a suitable line (not shown) with the brake cylinder, such as brake cylinder 3 or 3′ of FIGURES 1 or 2, not illustrated in this embodiment, in such a manner that during braking operation the brake shoe 8 is forced against the brake surface in the brake drum and simultaneously therewith is forced by the annular piston member 27 axially against the sheet-metal support member 1 for purposes of damping noise-producing vibrations. After completion of the braking operation, a spring 32 arranged on the bolt member 22 returns the brake shoe into the disengaged position thereof with respect to the support sheet-metal member 1.

It is thus seen that by a corresponding selection of the direction of the axis 12 and/or 12′ in FIGURE 1, by the leverage ratio at the intermediate member 15 in FIGURE 2, and by the effective pressure surface of the annular piston member 27 in FIGURE 3, axial contact pressures of the brake shoes against the support sheet-metal members are attained which preclude any annoying or objectionable brake noises without impairment in any case to a safe braking operation and functioning thereof.

While I have shown and described several embodiments in accordance with the present invention, it is understood that the same is not limited thereto but is susceptible of many changes and modifications within the spirit of the present invention, such as modifications of the brake system or actual construction of the individual parts thereof, and I intend to cover all such modifications and changes as encompassed by the appended claims:

I claim:

1. A hydraulically actuated shoe brake for motor vehicles comprising brake shoe means having brake lining means, means for energizing said brake shoe means including hydraulic means, a relatively stationary part in said brake, said means for energizing said brake shoe means including further means operatively connected with said hydraulic means for preventing vibrations and therewith objectionable brake noises by said brake shoe means during braking operation by selectively forcing said brake shoe means into and out of contact with said relatively stationary part in dependence on the hydraulic contact pressure existing in said hydraulic means, said hydraulic means including a piston and cylinder assembly, and said further means operatively connected with said hydraulic means being actuated by the piston of said assembly to force said brake shoe means against said relatively stationary part.

2. A hydraulically actuated shoe brake according to claim 1, wherein said further means includes intermediate connecting means between said piston and said brake shoe means.

3. A hydraulically actuated shoe brake according to claim 1, wherein said further means operatively connected with said hydraulic means include a piston and cylinder assembly supplied by fluid from said hydraulic means and operative to increasingly force said brake shoe means against said relatively stationary part with increasing pressure of said fluid.

4. A hydraulically actuated shoe brake according to claim 1, wherein said further means operatively connected with said hydraulic means include plunger means operatively connected with said piston and means confining the movement of said plunger means in a direction along the axis of said piston which is inclined with respect to said relatively stationary member so as to exert a force component on said brake shoe means in the direction toward said relatively stationary part, upon movement of said piston in response to hydraulic pressure in the cylinder of said piston and cylinder assembly.

5. A hydraulically actuated shoe brake according to claim 4, wherein said brake shoe means includes two pivotally supported brake shoe members, and wherein said piston and cylinder assembly includes two cylinder portions and a piston for each cylinder portion, the axis of each cylinder portion being symmetrically inclined with respect to said relatively stationary part so as to provide a force component by each piston for a respective brake shoe member in the direction toward said relatively stationary part, upon movement of each said piston in response to hydraulic pressure in a respective said cylinder portion.

6. A hydraulically actuated shoe brake according to claim 1, wherein said further means operatively connected with said hydraulic means include angle lever means connecting the piston of said assembly with said brake shoe means to simultaneously expand said brake shoe means for braking operation and force the same against said relatively stationary part.

7. A hydraulically actuated shoe brake according to claim 6, wherein said relatively stationary part is provided with a channel, a sliding member slidably accommodated in said channel, said angle lever means being pivotally supported in said sliding member.

8. A hydraulically actuated shoe brake according to claim 1, further comprising annular piston and cylinder means actuated by the pressure of the brake fluid for forcing said brake shoe means against said relatively stationary part during braking operation.

9. A hydraulically actuated shoe brake for motor vehicles comprising brake shoe means having brake lining means, means for energizing said brake shoe means comprising hydraulic means including a cylinder and piston assembly, a relatively stationary part in said brake contiguous to said brake shoe means and spaced therefrom a slight distance in the axial direction of the brake shoe means during periods of disengagement of the brake shoe means, said means for energizing said brake shoe means further comprising a member movable by said piston of said piston and cylinder assembly along a line inclined with respect to said relatively stationary part, said member having a spherically shaped head, a semi-spherically shaped bearing portion on said brake shoe means, said head being received in said portion, said brake shoe means in response to movement of said member along said line being forced against said relatively stationary part during energization of said brake shoe means to prevent vibration of said brake shoe means during said energization.

10. A hydraulically actuated shoe brake, according to claim 9, wherein said member is a plunger member.

11. In a hydraulically actuated shoe brake for motor vehicles comprising brake shoe means having brake lining means, means for energizing said brake shoe means comprising hydraulic means including a piston and cylinder assembly, said means for energizing said brake shoe means further comprising interconnecting means disposed between said brake shoe means and said piston, and a relatively stationary part in said brake contiguous to said brake shoe means and spaced therefrom during periods of disengagement of the brake shoe means; said interconnecting means including a translatable member and a portion on said brake shoe cooperating with said translatable member, mounting means for said translatable member to cause said translatable member during brake operation to impart a force to said brake shoe means in a direction inclined to said stationary part, said brake shoe means, upon translation of said translatable member, being forced against said stationary part to prevent vibration of said brake shoe means.

12. In a hydraulically actuated shoe brake according to claim 11, wherein said translatable member is a plunger having an end portion in connection with said portion on said brake shoe.

13. In a hydraulically actuated shoe brake according to claim 11, wherein said translatable member is an angle lever.

14. In a hydraulically actuated shoe brake according to claim 11 wherein said translatable member is a piston.

15. A hydraulically actuated shoe brake for motor vehicles comprising brake shoe means having brake lining means, a relatively stationary part in said brake contiguous to said brake shoe means and spaced therefrom during periods of disengagement of the brake, means for energizing said brake shoe means comprising hydraulic means and comprising further means interposed between said hydraulic means and said brake shoe means, said further means including means operable upon operation of said hydraulic means to force said brake shoe means against said stationary part in a direction inclined to said stationary part to prevent vibration of said brake shoe means during operation of said brake.

16. In a hydraulically actuated brake shoe for motor vehicles comprising brake shoe means having brake lining means, means for energizing said brake shoe means comprising hydraulic means including two substantially oppositely facing pistons having their longitudinal axes at an angle to each other, said means for energizing said brake shoe means further comprising interconnecting means disposed between said brake shoe means and each piston, a relatively stationary means spaced from said brake lining means during periods of disengagement of said brake, said longitudinal axes of said pistons being inclined to said relatively stationary means, said interconnecting means including a plurality of translatable members and cooperating portions on said brake shoe means, mounting means for said translatable members to cause said translatable members during brake engagement to impart force to said brake shoe means in a direction inclined to said relatively stationary means, said brake shoe means being thereby forced against said relatively stationary means to prevent vibration of said brake shoe means.

17. A hydraulically actuated brake shoe according to claim 1, wherein said brake shoe means include a two shoe brake.

18. A hydraulically actuated brake shoe according to claim 1, wherein said hydraulic means exerts its effective force substantially chordally to said brake lining means.

References Cited in the file of this patent

UNITED STATES PATENTS

| | | |
|---|---|---|
| 1,755,830 | Loughead | Apr. 22, 1930 |
| 1,927,139 | Sneed | Sept. 19, 1933 |
| 2,084,388 | Dodge | June 22, 1937 |
| 2,175,433 | Geyer | Oct. 10, 1939 |
| 2,286,532 | Freer | June 16, 1942 |
| 2,731,114 | Lambert et al. | Jan. 17, 1956 |
| 2,852,105 | House | Sept. 16, 1958 |